Patent text 3,289,040
CURRENT PULSING CIRCUIT
Jean Pfau and Heinz Rhyner, Geneva, Switzerland, assignors, by mesne assignments, to Elox Corporation of Michigan, Troy, Mich., a corporation of Michigan
Filed June 21, 1962, Ser. No. 204,188
25 Claims. (Cl. 315—307)

The invention is concerned with a current impulse circuit comprising a main D.C. source, at least one make and break semi-conductor element connected in series by two of its electrodes between the main source and a load circuit, means for controlling the conductivity condition of the semi-conductor element by application of a control voltage to said element, said element having a bend defining volt-ampere characteristic limiting the maximum current that it can conduct.

This disclosure contains particular reference to transistors as the electronic switches employed in the several embodiments of the invention. It follows that with proper redesign of the circuit any "electronic switch" may be substituted. By "electronic switch" is meant any electronic control device having three or more electrodes consisting of at least two electrodes acting as a switch in the power circuit, the conductivity between said power electrodes being controlled by a control electrode within the switch responsive to drive from an external control circuit whereby the conductivity of the power circuit is controlled statically or electrically without movement of mechanical elements within the switch. The electronic switch may have various rise and fall characteristics but its important characteristic is that discrete pulses are produced.

This circuit is characterized by a transformer supplying the control voltage for bringing the make and break element to its non-conductive condition, a primary winding of this transformer being connected in series with an auxiliary voltage source and a unidirectional conductor, this series arrangement being connected in parallel across the semi-conductor element, the voltage of this source being less than that of the main source but higher than the voltage drop across the semi-conductor element when a current of lesser magnitude than that which corresponds to the bend of the characteristic flows through said semi-conductor element, the polarity of the unidirectional element being so selected as to permit the flow of current supplied by the auxiliary source through the make and break element when the latter is conductive and to prevent the main source from supplying current to said winding when the make and break element is non-conductive, the whole arrangement being such as to cause rapid blocking of the make and break element upon interruption of the flow of current through said winding, as soon as a voltage drop in excess of a predetermined value occurs across the make and break device.

This arrangement is very advantageous inasmuch that the make and break element or elements can be automatically blocked after a certain impulse period. This arrangement, in combination with other features which will be described hereinafter, also permits of automatically blocking the make and break element when the current flowing through the latter exceeds a critical value. This feature is very useful in certain applications, in particular in the machining of conductive materials by electric discharges between an electrode and a workpiece. Indeed, in this latter application, direct short-circuits between the electrode and the workpiece often occur and it is of great interest to be able to cut off all machining current when such a circuit occurs in order to avoid either deterioration of the machined surface of the workpiece, or the destruction of the make and break element or elements controlling the flow of current impulses.

For a better understanding of the invention and to show how the same may be carried into effect, reference will now be made to the accompanying drawings in which.

Figure 1:
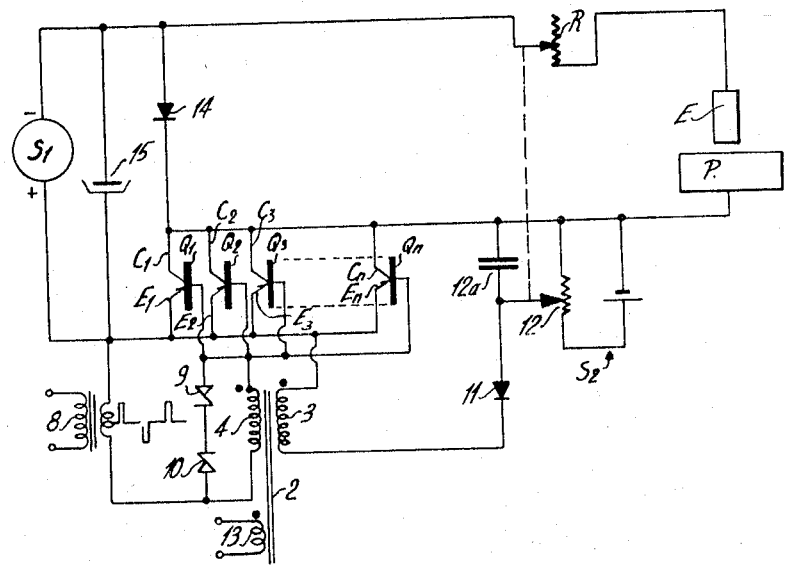
FIGURE 1 illustrates a first constructional form of circuit according to the invention, for electrical machining by means of intermittent discharges and including a battery of transistors.

The circuit illustrated in FIGURE 1 constitutes a generator of impulses for machining metals by means of intermittent discharges.

This circuit includes a D.C. source $S_1$, the negative terminal of which is connected via a variable resistance R to a machining electrode E, whereas its positive terminal is connected to a workpiece P via a battery of PNP type transistors $Q_1$–$Q_n$. All of these transistors are connected in parallel and are intended to chop or pulse the current supplied by the source $S_1$ in order to form substantially rectangular impulses.

All of the transistor collectors $C_1$–$C_n$ are connected by a diode 14 to the negative side of the source $S_1$, whereas all of the emitters $E_1$–$E_n$ are connected to the positive side of the source $S_1$, which positive side is itself connected to the negative side of the source by an electrolytic capacitor 15. This capacitor 15 and the diode 14 serve to prevent possible over-voltages from occurring between the collectors and the emitters when the transistors cut off the current flow.

The circuit further comprises an auxiliary current source $S_2$ consisting of a potentiometer 12 supplied with direct current, the slider of which is connected to the collectors of the transistors $Q_1$–$Q_n$ by a capacitor 12a and to the emitters of these transistors via a diode 11 and via the primary winding 3 of a transformer 2 having a substantially rectangular magnetic characteristic.

The transformation ratio between the primary winding 3 and the secondary winding 4 of the transformer is 1:1. In FIGURE 1, one terminal of each winding of this transformer has been marked by a black dot or circle in order that the direction of each winding may be recognized. These dots mean that the marked ends of the windings all have the same polarity at the same instant as far as the induced voltages are concerned.

The secondary winding 4 is connected, at one end, to the emitters $E_1$–$E_n$ via the secondary winding of an impulse transformer 8 and, at the other end, to the bases of the transistors. The winding 4 is moreover shunted by two Zener diodes 9 and 10 which are oppositely phased. As is known, a Zener diode is a device which allows current to pass in one direction with practically no resistance, but which sets up a high resistance to the passage of current in the opposite direction in the absence of an applied voltage of predetermined value. When the applied voltage across the diode exceeds this predetermined value, which is termed "Zener voltage," the diode becomes conductive in said opposite direction.

A winding 13 is provided to bias magnetically the core of the transformer 2. The diode 11 is so connected that it will allow passage of current supplied by the auxiliary source $S_2$ and prevent the passage of current supplied by the source $S_1$ when the transistors $Q_1$–$Q_n$ are blocked. This current can flow in the circuit comprising the emitters and the collectors of the transistors $Q_1$–$Q_n$ if the latter are conductive and if the potential difference between their emitters and their collectors is less than the potential difference across source $S_2$.

To give a concrete example, it will be assumed that the Zener voltage of diode 9 is 4 v., that the Zener voltage of diode 10 is 8 v. and that the source $S_2$ has a potential difference of 3 v. To render transistors $Q_1$–$Q_n$ conductive, a current impulse is sent via transformer 8 such as to generate in the secondary winding of this transformer a voltage of about 10 v. The polarity of this voltage is such that it tends to render the bases of transistors $Q_1$–$Q_n$ negative in relation to their emitters and since this voltage is higher than the Zener voltage of diode 10, the current required to polarize the base may flow through this diode 10 and through diode 9, the latter being arranged in the normal direction of flow of the current.

It should be noted that as long as the transistors are in their blocking condition, no current can flow in the primary winding 3 of transformer 2, since the potential difference between the emitter and the collector is equal to the voltage of source $S_1$ (for example 40 v.), which voltage is higher than that of source $S_2$. Under those conditions, the latter is unable to supply a current and the source $S_1$ is also unable to cause a current to flow through winding 3 due to the blocking action of diode 11.

At the instant transistors $Q_1$–$Q_n$ are rendered conductive by the starting impulse, the potential difference between the emitters and the collectors becomes practically nil, so that the source $S_2$ causes current to flow through winding 3 in the direction allowed by diode 11. This current becomes larger and larger and causes an increase of the magnetic field of the transformer 2 as long as the core of the latter is not saturated. During increase of this magnetic field, a voltage of about 2 v. is induced in the secondary winding 4 due to the losses incurred in the transformer 2, which voltage keeps the bases negative in relation to the emitters in order to maintain the transistors conductive.

It should be observed that the diodes 9 and 10 are not conductive below 4 v. so that the secondary winding 4 is not short-circuited by these diodes. When the transformer 2 becomes saturated, the potential of the bases becomes the same again as that of the emitter. This tends to block the transistors and to bring about between the emitters and the collectors a potential difference which opposes the flow of current through the primary winding 3 of the transformer. The lessening of this current generates a reverse voltage in the secondary winding 4 of the transformer due to the biasing current flowing through the winding 13, which voltage tends to render the bases positive in relation to the emitters and to block still more the transistors.

In the present embodiment, the blocking of the transistors may also occur before saturation of the transformer 2 when the machining current flowing through the transistors $Q_1$–$Q_n$ exceeds a maximum value. Indeed, for example in the event of a short-circuit occurring between the electrode E and the workpiece P, the increase in current causes, above a certain value which depends on the amount of current flowing through the bases, a large increase in the voltage drop between the emitter and the collector, in accordance with a well-known characteristic of the transistors due to the bend in their voltage-ampere curve. As soon as this voltage drop exceeds the voltage of source $S_2$, the current in the primary winding 3 can flow no longer thereby inducing in the secondary winding 4 a voltage tending to render the bases positive in relation to the emitters and to block the transistors. This voltage is limited by the Zener diode 10 to 8 v. thereby protecting the bases from any overvoltage whilst ensuring rapid demagnetization of the transformer 2. By way of modification, this Zener diode 10 could be replaced by a resistance.

The above described circuit has many advantages over the known standard circuits in which the blocking of the transistors does not occur automatically when the voltage drop across the terminals of these transistors exceeds a given value. If resistance R has a value such as to cause a voltage drop of 15 v. during flow of the machining current, assuming that the voltage at the main source is 40 v. and that the voltage across the electrode and the workpiece is 25 v., it will be apparent that in the event of a short-circuit taking place, all of the voltage drop will occur in the resistance R so that the current flowing through the latter will increase 2.7 times.

In a standard circuit, the fact that it is possible to produce a fresh impulse by means of the transistors whilst the electrode and the workpiece are short-circuited must be taken into account. It is therefore necessary to make use of a battery of transistors capable of withstanding the short-circuit current which is much larger than the machining current. If it is desired not to use too large a number of transistors, it is also possible to give resistance R a larger value so as to bring about a voltage drop of say 24 v. during normal machining. If the voltage drop across the electrode and the workpiece is 25 v., the source will have to have a voltage of 50 v. In such an event, the short-circuiting current will only be double the machining current. But, on the other hand, more power would be lost in the resistance R thereby lowering the efficiency of the circuit.

In the illustrated circuit, however, it is not possible to energize the transistors when the electrode and the workpiece are short-circuited inasmuch that should a short-circuit occur at the instant when an energization impulse is transmitted by the impulse transformer, the voltage drop across the terminals of the battery of transistors would become larger than the voltage of the auxiliary source $S_2$. Consequently, this source cannot cause a current to flow in the winding 3 of the transformer 2 and the circuit cannot be closed to cause a long lasting impulse to flow between the short-circuited electrode and workpiece. In this event, the transistor battery may have a current capacity which is only slightly larger than the maximum machining current. By acting on the potentiometer 12, the current value at which automatic blocking occurs can easily be adjusted, this value being, for example, 10 to 15% larger than the machining current value.

In the described circuit, the height of the machining current impulses is adjusted by varying resistance R.

The slider of the potentiometer, which constitutes one of the outlet terminals of the source $S_2$, is mechanically controlled by the slider of resistance R so that the voltage supplied by source $S_2$ will increase when the resistance of R diminishes. Accordingly, the voltage applied to the bases whilst the transistors are conductive increases when machining with higher current impulses thereby avoiding the above described automatic blocking phenomenon as long as there is no short-circuit. In this latter event, blocking occurs automatically. Instead of fixing the height of the impulses by means of resistance R, it is particularly advantageous to replace the latter by the inductive current limiting means disclosed in the specification of Patent No. 3,257,583.

In this first embodiment, the current impulse flowing through the transistors $Q_1$–$Q_n$ may also be interrupted from outside by sending to the transformer 8, some time after the starting impulse, a cutting off impulse having a direction such as to render the transistor bases positive in relation to the emitters, this voltage being over 4 v. Consequently, diodes 9 and 10 become conductive since diode 10 allows current to pass freely and since the above voltage is higher than the Zener voltage. The blocking of transistors $Q_1$–$Q_n$ therefore takes place very rapidly particularly so since the current supplied by the source $S_2$ ceases to flow through the primary winding 3 as soon as the blocking action is initiated, thereby inducing a positive voltage in the secondary winding 4 which also tends to block the transistors. By adjusting the frequency of the starting impulses and their spacing from the cut-off impulses, the frequency and the duration of the machining current impulses can be varied.

In the above-described form of construction, details may variously be modified without in any way affecting the principle of operation. Thus, the Zener diodes 9 and 10 may be dispensed with. In this event, a resistance could be connected in parallel with one of the three windings of the transformer 2 in order to limit the positive overvoltages on the bases when blocking of the transistors is started. The starting and cutting off operations would however be slower. This drawback could be overcome by placing this resistance in parallel with the secondary winding 4. The auxiliary source $S_2$ could also be employed to supply the biasing current for the transformer 2.

Figure 2:
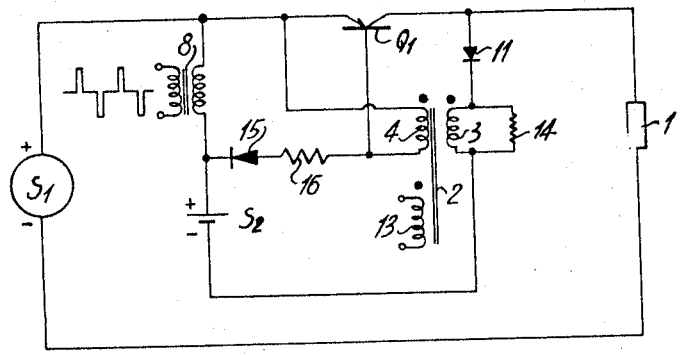
FIGURE 2 illustrates a second constructional form of circuit according to the invention.

FIGURE 2 illustrates a modification of the FIGURE 1 circuit, for supplying impulses to a load 1 and in which the starting impulses are applied in parallel in a circuit for controlling the base of a transistor Q and the cut-out impulses are applied in series with the primary winding of a transformer 2. In the circuit for controlling the base of a transistor $Q_1$, one terminal of the auxiliary source $S_2$ is connected to the emitter via the secondary winding of the impulse transformer 8. This terminal of source $S_2$ is also connected to the base of the transistor via a diode 15 and a resistance 16. This circuit makes it possible for impulses to be sent directly to the base in order to render the transistor conductive but, because of diode 15, does not make it possible to apply directly to the base of the transistor impulses which are transmitted by the transformer 8 in order to block the transistor. The blocking impulses are, however, applied to the primary winding 3 of transformer 2 and oppose the continued flow of current supplied by the source $S_2$. The diode 15 could, however, be replaced by a Zener diode so that blocking impulses could also be sent via transformer 8, provided that the voltage of these impulses be higher than the maximum blocking voltage of the Zener diode that is used.

A resistance 14 is connected in parallel with the primary winding 3 to limit the positive overvoltage applied to the base at the beginning of the blocking action.

The resistance 16 is not essential although its action is advantageous inasmuch that it serves to limit the current between the base and the emitter when sending the starting impulse, thereby preventing the transistor from remaining conductive after sending the starting impulse when the impedance of the load 1 is below a predetermined value. It is apparent that such a property is very advantageous when the circuit is used for purposes of electrical discharge machining since this property makes it possible to prevent a fresh current impulse from being sent as long as a short circuit exists between the electrode and the workpiece and as long as the conditions for setting up an arc between these two members are not satisfied. In more precise terms, it is thus possible to determine freely, by adjustment of resistance 16, the minimum resistance in the gap between the electrode and the workpiece at which machining impulses may be generated. Experience has shown that it is thus possible to reduce considerably the erosion of the electrode without, however, at the same time reducing too much the mean machining current, i.e. the machining efficiency.

In the FIGURE 2 circuit, the diode 15 could also be replaced by two oppositely mounted Zener diodes. In such an event, the cutting off operation is initiated both by the primary and secondary windings of transformer 2.

Figure 3:
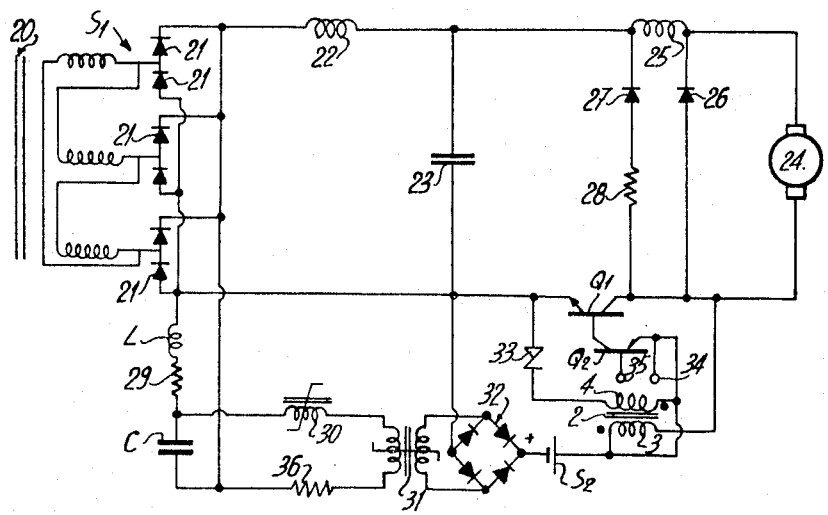
FIGURE 3 illustrates a third constructional form of circuit according to the invention, which circuit constitutes a limited D.C. source feeding an electric motor.

FIGURE 3 illustrates a circuit constituting a D.C. source of variable limited current and of variable voltage. The source $S_1$ of the preceding embodiments is constituted by the secondary windings of a three-phase transformer 20 feeding a series of rectifiers 21 in order to provide a continuous voltage which is filtered by a self-induction coil 22 and by a capacitor 23.

The current supplied by the source serves to feed the rotor winding 24 of a D.C. shunt motor, which current flows through a self-induction coil 25 and a transistor $Q_1$.

The two silicon diodes 26 and 27 are connected in parallel across the armature of the motor respectively upstream and downstream of the self-induction coil 25, the diode 27 being connected in series with a resistance 28. The diode 26 serves to prevent the current flowing through the armature from being interrupted when the transistor $Q_1$ cuts off the current supplied by the rectifiers 21, and to avoid overvoltages between the emitter and collector of transistor $Q_1$. The capacitor 23 completes this action.

When the cutting off operation is started, the armature current flows only through the diode 27, the resistance 28 and the self-induction coil 25. As the latter has a much smaller inductive value than that of the rotor winding 24, the current flowing therethrough drops rapidly to about zero, despite the relatively low value of resistance 28, thereby facilitating the restarting operation of transistor $Q_1$ at the next impulse in the event this restarting operation is carried out whilst a large current still flows through the circuit formed by the diode 26 and the rotor winding 24. Indeed, when the transistor $Q_1$ is rendered operative, the current flow controlled by the latter increases progressively to energize the self-induction coil 25, before reaching the value of the current that still flowed through diode 26. When the current reaches this value, no current will flow through diode 26.

The starting operation of transistor $Q_1$ takes place at a fixed frequency which is twelve times higher than that of the mains. The driving power is supplied by the A.C. component of the voltage supplied by the recetifiers 21. This voltage is applied to a filter tuned to six times the frequency of the mains and consisting of a coil L, a resistance 29 and a capacitor C. This resistance 29 serves to limit overvoltage of this tuned circuit.

The alternating voltage across capacitor C is brought to the primary winding of an impulse transformer 31 via a saturable self-induction coil 30 and a resistance 36. The frequency of this voltage is six times higher than that of the mains so that it will reach 300 c./s. in the case of 50 c./s. mains.

The self-induction coil 30 has no air gap and is so dimensioned as to become abruptly saturated in the region of the top of the sinusoid representing the voltage across capacitor C. This coil 30 thus opposes the passage of current discharged by the capacitor C until it becomes saturated. Consequently, the energization of the primary winding of transformer 31 occurs abruptly. This transformer also comprises a saturable magnetic core and is so dimensioned as to become saturated far more rapidly than the coil 30. Immediately after the passage of the current allowed by coil 30, the core of transformer 31 also becomes saturated so that the secondary winding of this transformer produces a short voltage impulses each time the voltage of capacitor C passes near a peak value, the polarity of this impulse changing simultaneously with the alternations of the voltage of capacitor C. The resistance 36 limits the discharge of capacitor C at each impulse and limits the weakening or attenuating action of the filter.

The alternate impulses from the transformer 31 are rectified by a bridge rectifier 32, so that the latter supplies impulses of constant polarity and having a frequency double that of the voltage of capacitor C. These impulses are applied between the emitter and the base of transistor $Q_1$ which is a NPN type silicon power transistor and which can control a current of 25 A. at 200 v. The connection between the positive outlet of bridge 32 and the base of transistor $Q_1$ is made via a PNP type transistor $Q_2$ of low power (10 W., 3 A.).

The driving of transistor $Q_1$ is done as before via a transformer 2 having, in the present embodiment, no biasing winding but having however an air gap which fulfills a substantially equivalent function from the point of view of operation. The primary winding 3 of this transformer 2 is connected directly to the collector of transistor $Q_1$ and to the emitter of this transistor via an auxiliary source $S_2$ and the bridge rectifier 32 which, in the present embodiment, fulfills the same function as diode 11 in the previous embodiments.

The secondary winding 4 of transformer 2 is connected to the emitter of transistor $Q_2$ and to the emitter of transistor $Q_1$ via a Zener diode 33 having a Zener voltage of 10 v.

In the present embodiment, the current supplied by the secondary winding 4 of transformer 2 to the base of transistor $Q_1$ is independent of the voltage of this secondary winding because of transistor $Q_2$ which acts as a variable current limiting means and in which the maximum current limit is determined by the difference in potential applied between its emitter and its base by means of terminals 34 and 35.

In the present embodiment, the transistor $Q_1$ is rendered conductive by each impulse from the bridge rectifier 32. The blocking of this transistor $Q_1$ is achieved between each impulse by saturation of the transformer 2 which is so dimensioned as to be saturated in a period of time that is shorter than that between two successive impulses from the bridge 32. By varying the voltage of source $S_2$, the speed at which the transformer 2 is saturated can be varied and consequently the length of time during which the transistor $Q_1$ is conductive after each starting impulse received from the rectifier 32 can also be varied.

By varying the voltage applied between the emitter and the base of transistor $Q_2$, it is possible to regulate the maximum flow of current to the base of transistor $Q_1$ and consequently the maximum current that the transistor can withstand without causing the cutting off action that has already been described in connection with the preceding embodiments and which occurs each time the current supplied by the auxiliary source $S_2$ can no longer supply the primary winding of transformer 2. The illustrated circuit thus constitutes a source of limited maximum current, which current is adjustable by selection of the potential applied between the terminals 34 and 35 of transistor $Q_2$, and of adjustable means voltage, which voltage is proportional to the ratio between the length of time during which the transistor $Q_1$ is conductive and the repetition period of the impulses, this ratio being itself a function of the voltage of source $S_2$ which may be adjustable.

In the present embodiment, it would of course be possible to tune the filter constituted by the coil L and by the capacitor C on a harmonic of the A.C. component supplied by the rectifiers 21 and consequently to obtain a frequency for starting the transistor $Q_1$ which is a multiple of twelve times that of the mains, this starting frequency being capable of reaching, for example, twenty-four or thirty-six times that of the mains.

Figure 4:
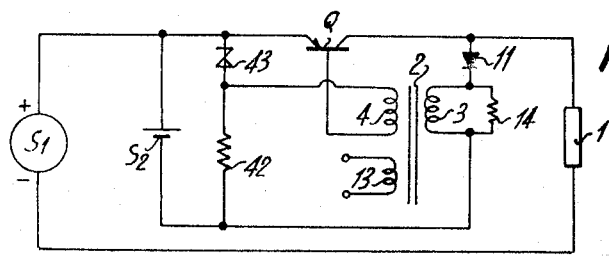
FIGURE 4 is the diagram of a fourth form of circuit according to the invention and operating as an oscillator due to the fact that the transistor is returned to its conductive condition after each impulse blocking action.

FIGURE 4 illustrates another embodiment in which the circuit operates as an impulse generating oscillator. In all of the previously described embodiments, when the transistor is blocked under the control of the transformer 2, either because of saturation of the transformer after an impulse has lasted a certain time, or because of interruption of the current supplied by source $S_2$ when the transistor Q is required to supply too large a current, the base is brought to a positive potential which is relatively high in relation to the emitter at the instant of the cutting off action. This can be accounted for by the speed of the cutting off action, which speed is due to the fact that at the instant when the winding 4 no longer maintains the necessary negative potential of the base relatively to the emitter, the operational characteristic of the transistor changes and the maximum current that the latter can supply becomes weaker, thereby immediately bringing about an increase in the potential drop between the emitter and the collector and consequently a decrease in the current supplied by the source $S_2$ and flowing through the winding 3. In the preceding embodiments, when the blocking action of the transistor is ended and the current supplied by the secondary winding 4 of transformer 2 returns to zero, the base is again at the same potential as the emitter, and the transistor consequently remains blocked.

In the FIGURE 4 diagram, a resistance 42 connects the auxiliary source $S_2$ to the winding 4 of transformer 2 and hence tends to apply a negative potential to the transistor base. Moreover, the secondary winding 4 is connected to the emitter via a Zener diode 43 so connected as to permit the free flow of current between the emitter and the base in the direction that will render transistor Q conductive.

Because of the negative potential applied to the transistor base by the auxiliary source $S_2$, the transistor comes to cause current supplied by the source $S_1$ to flow through the load 1. The source $S_2$ then causes current to flow through the winding 3 via diode 11, thereby generating a current in the secondary winding of transformer 2, which latter current also tends to maintain the base negative in relation to the emitter inasmuch that the Zener diode 43 allows the current to flow in the required direction through the circuit consisting of this diode, the emitter, the base and the winding 4. During saturation of the transformer 2, the base becomes less negative due to lessening of the current supplied by the secondary winding 4, thereby reducing the current flowing through the transistor Q and consequently, the current flowing through the winding 3.

The previously described phenomenon is then initiated and very rapidly, the winding 4 produces a current tending to apply a high positive voltage to the base of the transistor after eliminating the charge carriers accumulated in the base. This voltage is limited by resistance 14 and must be greater than the characteristic voltage of the Zener diode 43. The current impulse supplied by the transistor Q is thus blocked and a period of time elapses before the base ceases to be positive in relation to the emitter, and then becomes negative because of resistance 42 and of the Zener diode 43. The time that elapses from the end of an impulse to the beginning of the next impulse depends essentially on the value of resistance 14, on the saturation flux in the transformer 2 and on the current flowing through the biasing winding 13.

In this last embodiment, it is not necessary to provide a transformer for applying control impulses to the transistor, but it will of course be understood that such impulses could be sent in the same manner as in the previously described embodiments. In particular, the impulses for rendering the transistor conductive could be utilized for ensuring synchronization of the impulses supplied by the oscillator with another frequency source.

Figure 5:
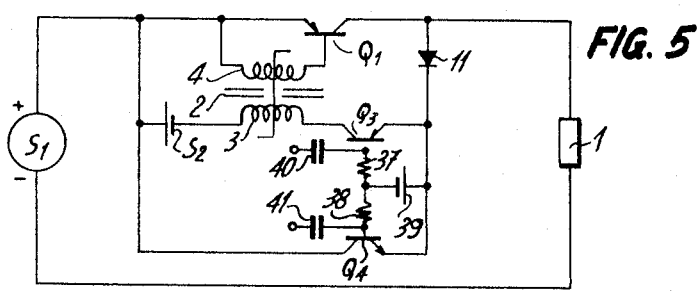
FIGURE 5 illustrates a fifth constructional form of circuit according to the invention.

FIGURE 5 illustrates a modified form of circuit in which the starting and cutting off impulses of the main transistor $Q_1$ are controlled by means of two transistors $Q_3$ and $Q_4$ of low power. In this circuit, the secondary winding 4 of transformer 2, which is formed with an air gap, is directly connected to the emitter and to the base of transistor $Q_1$. The primary winding 3 is connected in series with the auxiliary source $S_2$, the transistor $Q_3$ and a diode 11. The second transistor $Q_4$, when conductive, enables the auxiliary source $S_2$ to be directly connected to the primary winding 3 of transformer 2.

The emitters of the PNP type transistor $Q_3$ and of the NPN type transistor $Q_4$ are directly connected. The bases of these two transistors are respectively connected by means of resistances 37 and 38 to the negative terminal of a biasing source 39. Positive starting and cut off impulses from the main transistor $Q_1$ are applied to the bases of the transistors $Q_3$ and $Q_4$ via capacitors 40 and 41. In the absence of starting and cut off impulses, the transistor $Q_3$ is conductive and the transistor $Q_4$ is blocked.

Many modifications can of course be made to the above described circuits. For example, the impulses for controlling the starting and cutting off operations of the main transistor or transistors could be applied directly to the transformer 2 by means of an additional winding provided thereon.

In the embodiments according to FIGURES 1 and 2, the transformer 2 could also be provided with an air gap and have no biasing winding. In all cases where an impulse transformer 8 is provided, it is advantageous for the latter to be so dimensioned as to become saturated between impulses.

In the case of FIGURE 2, the secondary winding 4 of the transformer 2 could be connected in series with a Zener diode, this winding 4 and the Zener diode being in turn connected to the emitter and to the base of transistor $Q_1$. The polarity of the Zener diode should then be so selected as not to oppose the passage of current from the secondary winding 4 in order to maintain the transistor conductive, a source of short unidirectional impulses being connected in parallel with the winding 4 and the Zener diode.

Should it be possible to devise semi-conductor devices, the conductivity of which would be controlled by applying a voltage to an electrode and the blocking action of which would be controlled by applying a voltage to another electrode, it would then be necessary to modify the diagram so as to apply the starting and blocking voltages to the appropriate electrodes.

The invention makes it possible to do away with the amplification chains that are normally used in known circuits and which can cause, in case the chain becomes defective, the burning out of a whole battery of power transistors resulting from an abrupt increase in the emitter-collector voltage, i.e. in the power dissipated in the transistors, caused for example by a lessening of the control voltage applied to the bases.

We claim:

1. In an electrical circuit comprising a main voltage supply, a load, and at least one electronic switching means, a control electrode and having its power electrodes operatively connected between said supply and the load, a control circuit comprising a pulsing means operable to provide triggering pulses for rendering said switching means periodically conductive to deliver power pulses to the load, means operatively connected across the power electrodes of said switching means and operatively connected to the control electrode of said switching means for maintaining it conductive a predetermined time after its being rendered conductive by said pulsing means, said last-mentioned means operable responsive to voltage drop across said power electrodes above a predetermined level to render said switching means instantaneously nonconductive.

2. The combination as set forth in claim 1 in which said electronic switching means comprises a transistor connected in common emitter relationship with the load and in which said pulsing means comprises a source of spaced pulses of opposite polarity operatively connected to its base for rendering said transistor alternately conductive and nonconductive.

3. In an electrical circuit comprising a main voltage supply, a load, and at least one electronic switching means having a control electrode and having its power electrodes operatively connected between said supply and the load, a control circuit comprising a pulsing means operable to provide triggering pulses for rendering said switching means periodically conductive to deliver power pulses to the load, means operatively connected across the power electrodes of said switching means and operatively connected to the control electrode of said switching means for maintaining it conductive a predetermined time after its being rendered conductive by said pulsing means, and a means operable responsive to voltage drop across said power electrodes above a predetermined level to render said switching means instantaneously non-conductive, said last-mentioned means comprising a unidirectional current conducting device, a primary winding of a saturable transformer and an auxiliary voltage source connected in series across said power electrodes, said source and said device phased to conduct current additive to that of said main supply, and a secondary winding of said saturable transformer operatively connected to the control electrode of said switching means.

4. The combination as set forth by claim 3 in which a means is operatively connected to said transformer for varying its saturation characteristic to selectively vary said predetermined time.

5. The combination as set forth in claim 3 in which said pulsing means comprises an input transformer having its secondary connected in series with said secondary winding of said saturable transformer.

6. The combination as set forth in claim 3 in which said secondary winding has connected thereacross at least one Zener diode of a voltage breakdown less than the voltage of said auxiliary source for expediting the turn-Off of said switching means.

7. In an electrical circuit comprising a main voltage supply, a load, and at least one electronic switching means having a control electrode and having its power electrodes operatively connected between said supply and the load for pulsing the load, a control circuit comprising a pulsing means for rendering said switching means alternately conductive and nonconductive, an overvoltage protective circuit for rendering said switching means nonconductive responsive to excessive voltage drop across its power electrodes comprising an auxiliary voltage source of lesser magnitude than said main supply, a series combination of a unidirectional current conducting device and a primary winding of a transformer, said series combination and said auxiliary source operatively connected across said power electrodes of said switching means with like polarity to said main supply, and a secondary winding of said transformer operatively connected to the control electrode of said switching means for maintaining drive signal thereto from said auxiliary source responsive to said switching means being rendered conductive and for interrupting said drive signal responsive to overvoltage across said power electrodes of said switching means.

8. The combination as set forth in claim 7 in which said auxiliary voltage source comprises a D.C. source, a potentiometer having the terminals of its variable resistance connected across said D.C. source and a capacitor connected across one of said terminals and the movable contact of said potentiometer.

9. The combination as set forth in claim 7 in which said pulsing means comprises an input pulse transformer having its secondary connected in series with said secondary winding of said first mentioned transformer.

10. The combination as set forth in claim 7 in which said switching means comprises at least one transistor connected in common emitter relationship with the load, in which said series combination and said auxiliary source are connected across its power electrodes and in which said secondary is operatively connected across said control electrode and one of said power electrodes.

11. The combination as set forth in claim 7 in which said transformer is of the saturable type and in which a bias winding is included for selectively varying its degree of saturation.

12. In an apparatus for machining a conductive workpiece by intermittent electrical discharge across a gap between a tool electrode and the workpiece in the presence of a dielectric coolant, a machining power circuit comprising a main power supply operatively connected across the gap, an electronic switching means having a control electrode and having its power electrodes operatively connected between said supply and said gap, pulsing means operatively connected to the control electrode of said switching means for rendering it periodically conductive and nonconductive to provide machining pulses to the gap, and a protective circuit for rendering said switching means nonconductive responsive to short circuit of the gap comprising a unidirectional current conducting device, a primary of a transformer and an auxiliary voltage source of lesser voltage magnitude than said main supply operatively connected across said power electrodes, said source and said device phased to conduct current additive to that of said main supply, and a secondary winding of said transformer operatively connected to the control electrode of said switching means.

13. The combination as set forth in claim 12 in which said pulsing means comprises a pulse input transformer operatively connected to said secondary winding.

14. The combination as set forth in claim 13 in which the secondary of said pulse input transformer and said secondary winding of said transformer are connected in series across said control electrode and one power electrode of said switching means and in which a Zener diode is connected across said secondary winding of said transformer for expediting turn-Off of said switching means.

15. The combination as set forth in claim 12 in which said transformer is of the saturable type and in which a bias winding is included for selectively varying its degree of saturation.

16. The combination as set forth in claim 12 in which said switching means comprises a transistor connected in common emitter relationship in which said primary, said device, and said auxiliary voltage source are connected in series across its emitter and collector, and in which said secondary is operatively connected across its base and emitter.

17. In an apparatus for machining a conductive workpiece by intermittent electrical discharge across a gap between a tool electrode and the workpiece in the presence of a dielectric coolant, a machining power circuit comprising a main power supply operatively connected across the gap, an electronic switching means having a control electrode and having its power electrodes operatively connected between said supply and said gap, pulsing means operatively connected to the control electrode of said switching means for rendering it conductive to provide a machining power pulse to the gap, means for rendering said switching means nonconductive after a predetermined time comprising a unidirectional current conducting device, a primary of a saturable transformer and an auxiliary voltage source operatively connected across said power electrodes, said auxiliary source of lesser voltage magnitude than said main supply, said source and said device phased to conduct current additive to that of said main supply, a secondary winding of said saturable transformer operatively connected across the control electrode and one of said power electrodes, and means operatively connected to and controlling the saturation characteristic of said saturable transformer for selectively varying the On-time of said switching means.

18. The combination as set forth in claim 17 in which said last mentioned means comprises a bias winding operatively connected to said saturable transformer for selectively varying its saturation characteristics.

19. The combination as set forth in claim 17 in which said pulsing means comprises an input pulse transformer having its secondary winding operatively connected to one of said saturable transformer windings.

20. The combination as set forth in claim 17 in which said secondary winding of said saturable transformer has connected thereacross at least one Zener diode of a voltage breakdown less than the voltage of said auxiliary source for expediting turn-Off of said switching means.

21. The combination as set forth in claim 17 in which said switching means comprises at least one transistor connected in common emitter relationship with the gap and, in which said primary winding, said device and said auxiliary voltage source are connected across its control electrode and one of its power electrodes, and in which said secondary winding is operatively connected across said control electrode and the other of its power electrodes.

22. In an apparatus for machining a conductive workpiece by intermittent electrical discharge across a gap between a tool electrode and the workpiece in the presence of a dielectric coolant, a machining power circuit comprising a main power supply operatively connected across the gap, an electronic switching means having a control electrode and having its power electrodes operatively connected between said supply and said gap, pulsing means operable to provide triggering pulses for rendering said switching means periodically conductive to deliver machining power pulses to the gap, means operatively connected across the power electrodes of said switching means and operatively connected to the control electrode of said switching means for maintaining it conductive a predetermined time after its being rendered conductive by said pulsing means, said last-mentioned means operable responsive to voltage drop across said power electrodes above a predetermined level to render said switching means instantaneously nonconductive.

23. In an electrical circuit comprising a main voltage supply, a load and at least one electronic switching means having a control electrode and having its power electrodes operatively connected between said supply and the load, and a pulsing means operable to provide pulses for rendering said switching means periodically conductive and nonconductive to deliver power pulses to the load, an overvoltage protective network operatively connected across said power electrodes of said switching means for rendering it nonconductive responsive to voltage drop above a predetermined level during conduction, said network comprising an auxiliary voltage source and a unidirectional current conducting device connected across said power electrodes with like polarity to said main supply and a means operatively connected between said network and said switching means for interrupting power from said supply to said load.

24. In an apparatus for machining a conductive workpiece by intermittent electrical discharge across a gap between a tool electrode and the workpiece in the presence of a dielectric coolant, a machining power circuit comprising a main power supply operatively connected across said gap, an electronic switching means having a control electrode and having its power electrodes operatively connected between said supply and said gap, pulsing means operatively connected to the control electrode of said switching means for rendering it periodically conductive and nonconductive to provide machining pulses to the gap, and an overvoltage protective network operatively connected across said power electrodes of said switching means for rendering it nonconductive responsive to voltage drop above a predetermined level during conduction, said network comprising an auxiliary voltage source and a unidirectional current conducting device connected across said power electrodes with like polarity to said main supply and a means operatively connected between said network and said switching means for interrupting power from said supply to said gap.

25. In an electrical circuit comprising a main voltage supply and a load, a control circuit comprising an electrical switching means periodically rendered closed and open, and an overvoltage protective network operable responsive to voltage drop across said switching means above a predetermined level during conduction to render said switching means open, said network comprising a unidirectional current conducting device and an auxiliary voltage source connected across the terminals of said switching means with a polarity additive to that of said main supply and means operatively connected to said network for rendering said switching means open.

References Cited by the Examiner
UNITED STATES PATENTS

| | | | |
|---|---|---|---|
| 2,866,921 | 12/1958 | Matulaitis et al. | 315—227.1 |
| 2,915,693 | 12/1959 | Harrison | 323—22 |
| 2,978,633 | 4/1961 | Medlar | 323—89.12 |
| 2,979,639 | 4/1961 | Williams et al. | 315—227.1 |
| 3,018,411 | 1/1962 | Webb | 315—227.1 |
| 3,040,270 | 6/1962 | Gutzwiller | 307—88.5 |

ARTHUR GAUSS, *Primary Examiner.*

B. P. DAVIS, *Assistant Examiner.*